Patented Apr. 4, 1950

2,502,892

UNITED STATES PATENT OFFICE 2,502,892

LOCK NUT

Frank D. Saylor, Highland Park, Mich.

No Drawing. Application January 17, 1944,
Serial No. 518,590

3 Claims. (Cl. 85—32)

The invention relates to lock nuts, and more particularly to that type which depends for its locking effect on a surface coating on the threads which resists any tendency of the nut to work loose from the bolt or stud due to vibration or other causes.

I have discovered an effective means for accomplishing this purpose by providing on the internally threaded surface of the nut, a composite coating consisting of a layer of adhesive substance with an outer coating of an abrasive material.

Preferably, I use for the adhesive substance, a substance that is solid at ordinary temperatures and has a melting point at or above the boiling point of water. For example, I may use a substance defined generically as a pitch, one illustrative composition being known as candle pitch which has a melting point between 200° and 250° F.

The abrasive material may be selected from a wide variety of materials which are commonly classified as abrasives such, for example, as emery, sand, glass, carborundum, etc.

In applying the composition to the nut, it is preferable to heat the nut to a temperature of about 300° F. and then blow heated pitch through the internally threaded aperture therein, causing some of the pitch to adhere to the threads and form a thin layer over the same. While the layer of pitch is still at an elevated temperature, the emery is blown through the aperture and some of it is embedded in the surface of the pitch forming an abrasive layer. The nut is then allowed to cool and is ready for use.

When the coated nut is engaged with a bolt or stud and tightened in the usual manner, the combined effect of the adhesion and the abrasive increases the friction between the threads and resists any tendency for the nut to be loosened due to incidental shocks and vibrations, although permitting its removal when sufficient force is exerted by means of a wrench.

Thus by the simple expedient described above, I have provided an improved lock nut which is adapted for many purposes. While I prefer to apply the coating to the nut leaving the bolt untreated, it is obvious that one can reverse the procedure and apply the coating to the bolt or stud leaving the nut uncoated, or, if desired, apply the coating to both of the interengaging threaded members.

An alternative method of applying the composition to the nut is to mix the emery with the pitch and blow it into the threaded interior of the nut in one step instead of two steps as described above.

What I claim as my invention is:

1. A nut having a coating of pitch on the internally threaded portion thereof and emery on the surface of said pitch coating.

2. A nut having on the internally threaded portion thereof a coating of candle pitch having a melting point above 200° F. and emery on the surface of said pitch coating.

3. A screw threaded fastening member having a coating of pitch on the threaded portion thereof and emery on the surface of said pitch coating.

FRANK D. SAYLOR.

REFERENCES CITED

The following references are of record in the file of this patent:

UNITED STATES PATENTS

| Number | Name | Date |
| --- | --- | --- |
| 202,407 | Brunson | Apr. 16, 1878 |
| 271,026 | Bradford | Jan. 23, 1883 |
| 999,478 | Archer | Aug. 1, 1911 |
| 1,049,161 | Smith | Dec. 31, 1912 |
| 1,368,087 | Woodward | Feb. 8, 1921 |
| 1,550,282 | Rennerfelt | Aug. 18, 1925 |
| 1,792,800 | Bergbauer | Feb. 17, 1931 |
| 1,875,708 | Coughig | Sept. 6, 1932 |
| 1,934,315 | Levine | Nov. 7, 1933 |
| 2,066,958 | Brownback | Jan. 5, 1937 |
| 2,108,276 | Wadsworth | Feb. 15, 1938 |
| 2,146,819 | Hall | Feb. 14, 1939 |
| 2,231,238 | Winchester | Feb. 11, 1941 |
| 2,246,554 | Twyning | June 24, 1941 |
| 2,321,414 | Parker | June 8, 1943 |